3,413,343
PROCESS FOR REMOVING DISCOLOR-
ING AGENTS FROM THE PRODUCTS
OF CHROMATE OXIDATION
Joe T. Kelly, Littleton, Colo., assignor to Marathon Oil
Company, Findlay, Ohio, a corporation of Ohio
Filed Apr. 1, 1965, Ser. No. 444,713
12 Claims. (Cl. 260—524)

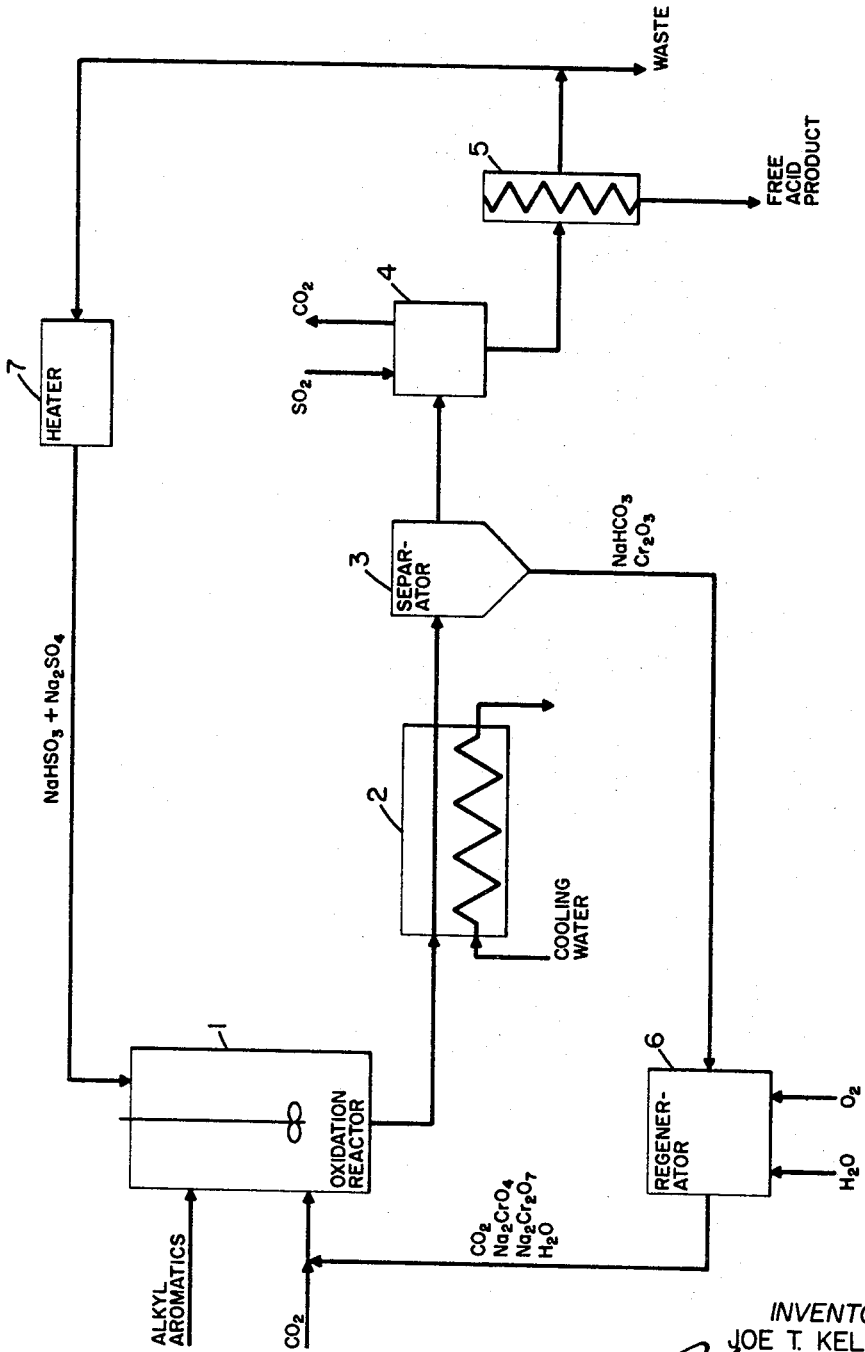

The present invention relates to new methods for the removal of objectionable impurities from the products of chromate oxidation processes, and in particular, relates to economical cyclic processes involving the recovery and reuse of the reagents used in such process.

Processes for the chromate oxidation of alkyl-aromatic hydrocarbons and other organic compounds have been described in the literature, e.g., Friedman, Fishel, and Shechter, Chicago, American Chemical Society meeting (September 1964), Preprints of Division of Petroleum Chemistry, vol. 9, No. 4, p. D-87; and Yuki Gosei Kagaku Kyokai Shi, vol. 20, p. 277 (1962), by J. Yamashita, K. Kurashima, and S. Kato. Copending application Ser. No. 433,081, filed Feb. 16, 1965, by Joe T. Kelly discloses processes for the removal of heavy metals which tend to cause discoloration of the products of chromate oxidation reactions and products derived therefrom. The present invention provides improved new methods for the removal of such metals by processes which permit the recycling and reuse of reagents in order to effect maximum economies. In addition, in many instances, the present invention may be practiced by the use of inexpensive refinery off-gases rather than the sulfuric acid most commonly used in conventional chromate oxidation processes to convert the oxidized products to the corresponding acids.

FIGURE 1 is a schematic diagram of a preferred batch process embodiment of the present invention.

In FIGURE 1 alkylaromatic hydrocarbons are fed to an oxidation reactor 1 where they are treated with stirring with from 1.5 to about 4 and preferably from 1.8 to about 2.2 moles of $Na_2CrO_4$, from 0.7 to about 2 and preferably from 0.9 to about 1.1 moles of $Na_2Cr_2O_7$ (or preferably a corresponding mixture of these components) per alkyl group to be oxidized, sufficient water to dissolve the $Na_2CrO_4$, and $Na_2Cr_2O_7$, and sufficient $CO_2$ to maintain a reactor pressure of from 1,000 to about 2,500 and preferably from 1,200 to about 1,600 p.s.i.g. Agitation is continued for reaction time of from 0.5 to about 6 and preferably from 2 to about 3 hours. The product mixture in the case of dibasic acid formation is then treated with a hot, (preferably 100 to 212° F., most preferably 180 to 200° F.) aqueous solution containing about 0.75 mole of $NaHSO_3$ and about 0.25 mole of $NA_2SO_4$ which is recycled from a point further on in the process. Almost immediately the color of the solution of product mix changes from orange to a deep green due to precipitation of finely divided $Cr_2O_3$ which is formed from Cr (VI). The reaction product is then preferably cooled, most preferably from 30 to about 150° F. to minimize solubility of the chromate precipitate; and the product mixture is then filtered or centrifuged or otherwise treated to separate the liquid and solid by conventional means. The precipitate is retained for later regeneration and reuse. To the filtrate is added 1 to about 4 moles of $SO_2$ per alkyl group of the alkyl hydrocarbon reacted in order to convert the metal salts, e.g., sodium benzoate, etc., which exist in the product mix at this point into the corresponding carboxylic acids. The sulfur dioxide may most economically be obtained by using off-gases from refinery processes, but sulfur dioxide from other sources may, of course, be employed. Any unprecipitated bicarbonate or carbonate remaining in the product mixture at this point reacts with the $SO_2$ to give $CO_2$ and sodium bisulfite. The $CO_2$ is evolved from the product mixture by venting. The oxidation product is next filtered out or otherwise conventionally separated and sent on for further purification if desired. The oxidation product will in most cases be the free carboxylic acid. However, in some cases, e.g., in Example V of this application, the mono or poly carboxylic metal salt will be produced. Such metal salts may be converted to the acid by disproportionation, by acidification, by ion exchange using weak carboxylic acid type resins, or by some other preferred means.

The filtrate at this point will contain some sodium bisulfite and some sodium sulfate and a portion of this stream is recycled back through heater 7 to the oxidation reactor 1 for precipitation of additional quantities of chromate. Where desirable, a portion of the filtrate stream can be conventionally pyrolyzed to convert the sodium bisulfite to sulfur dioxide and sodium hydroxide for chromate precipitation, and pH adjustment respectively.

Since more $NaHSO_3$ is produced in the acidification of the carboxylic acid salt than is consumed in conversion of Cr (VI) to Cr (III) some portion of the filtrate stream may be discarded.

The $NaHCO_3/Cr_2O_3$ precipitate obtained from the first separation in the separator 3 can be mixed with water to form a slurry and transferred to the regenerator 6 where it is heated with air or other source of oxygen. The effluent from the regenerator then consists of $CO_2$, $Na_2CrO_4$, $Na_2Cr_2O_7$, and water and this stream may be added to the oxidation reactor to oxidize further alkylaromatics. In most cases, make-up $CO_2$ must also be added to the oxidation reactor. Where the $Cr_2O_3/NaHCO_3$ stream is recycled in addition to the $NaHSO_3/Na_2SO_4$ stream, particularly economical manufacture of the alkylaromatic acids is possible.

This invention may be employed advantageously with a wide variety of alkylaromatics including among others, monoalkyl napthalenes such as methyl-, ethyl-, and propyl pylbenzene, and butylbenzene; dialkyl benzenes such as dimethylbenzenes, diethylbenzenes, dipropylbenzenes and dibutylbenzenes; and other polyalkyl benzenes such as trimethylbenzenes, triethylbenzenes, and tripropylbenzenes; monoalkyl napthalenes such as methyl-, ethyl, and propyl-naphthalenes, dialkyl naphthalenes such as dimethyl-, diethyl-, and dipropylnaphthalenes; polyalkyl naphthalenes such as trimethylnaphthalenes, tetramethylnaphthalenes, and dimethyldiethylnaphthalenes; and the corresponding tetralin derivatives, alkyl phenanthrenes, alkyl anthracenes, etc. Especially preferred are the mono and dialkyl benzenes and naphthalenes wherein the alkyl groups contain from 1 to about 6 carbon atoms, and of these, those having methyl groups are most preferred.

While the above mentioned process has been described as involving $NaHCO_3$, $Na_2Cr_2O_7$, and $Na_2CrO_4$, it should be understood that sodium is intended to be merely exemplary of the cations which may be employed and that any of the corresponding alkali metal salts having suitable solubility and reactivity and even the corresponding salts of other suitable cations may be employed in the process. Also, the invention should be understood to be operable on either a batch or a continuous basis.

The pH of the product mixture prior to addition of the metal bisulfite should be adjusted as necessary to be from about 6 to 10 and preferably at least 7. In many cases the mixture will have a pH within the above ranges without adjustment.

EXAMPLE I

Preparation of pyromellitic acid and sodium pyromellitate

Utilizing an equipment system similar to that described in FIGURE 1, there is fed to a 500 gallon pressure type agitated oxidation reactor 110 pounds of 1,2,4,5-tetramethylbenzene (a 10% excess over stoichiometric quantity), roughly 220 pounds of $CO_2$, the amount necessary to maintain the below mentioned reactor pressure, and an aqueous $Na_2Cr_2O_7/Na_2CrO_4$ solution consisting of 670 pounds of sodium dichromate ($Na_2Cr_2O_7 \cdot 2H_2O$), 350 pounds of sodium chromate ($Na_2CrO_4 \cdot 4H_2O$) and 2,000 pounds of water. The oxidation reactor operates at about 1,500 p.s.i.g. maintained by the $CO_2$ feed and at about 260° F. This temperature and pressure are maintained in the reactor for a period of about 1 to 2 hours. After recovery of the unreacted alkylaromatics (amounting to about 10% of the total alkylaromatics added to the reactor) for later recycle to the reactor, the product mixture is treated in the oxidation reactor with a hot (about 190° F.) solution consisting of 60 pounds of $NaHSO_3$, 5 pounds of $Na_2SO_4$, and 400 pounds water. The product mixture immediately changes from its original orange color to a deep green color and a precipitate consisting primarily of $NaHCO_3$, and $Cr_2O_3$ is produced. The contents of the reactor are then run through a chiller to cool them to about 100° F. and thence into a conventional centrifugal separator to separate out the solid precipitate. The liquid phase is next treated in a second reactor with 225 pounds of sulfur dioxide. A significant quantity of $CO_2$ is evolved as the sulfur dioxide is sparged into the liquid phase and this $CO_2$ may be recovered for reuse in the oxidation step. Free pyromellitic acid is precipitated during the sulfur dioxide treatment and this is recovered by filtering the mixture at a temperature of about 70° F. The filtrate from this step consists of about 325 pounds of $NaHSO_3$, 30 pounds of $Na_2SO_4$ and 2,100 pounds of water. Approximately 80% of this is discarded and the remainder is stored for reuse.

The $NaHCO_3/Cr_2O_3$ solid phase from the separator is mixed with water to form a slurry and then heated in a regenerator to about 280° F. for about one hour during which time it is blown with air under pressure of about 1000 p.s.i.g. The resulting product consists of a mixture of $CO_2$ with hydrates of $Na_2CrO_4$, $Na_2Cr_2O_7$, and water. This mixture is fed to the oxidation reactor containing a fresh charge tetramethylbenzene, and sufficient $CO_2$ is added to maintain the reactor pressure all as discussed above in this example. After a reaction time of about one half hour, the $NaHSO_3/Na_2SO_4$ solution which has been stored for reuse is added to the reactor; cooling, separation, treatment with $SO_2$, and filtration, are performed as before yielding similar quantities of $NaHCO_3/Cr_2O_3$ mixture, $NaHSO_3/Na_2SO_4$ solution, and free acid product.

EXAMPLE II

When 2,6-dimethylnaphthalene is treated as in Example I with all reagents being utilized in quantities approximately equi-molar with those used in Example I, a similar yield of 2,6-dicarboxynaphthalene is obtained.

EXAMPLE III

Similar molar yields of terephthalic acid are similarly obtained from p-xylene.

EXAMPLE IV

Similar molar yields of trimesic acid are similarly obtained from 1,3,5-trimethylbenzene. The monosodium salt is initially formed and this is converted to the acid by $H_2SO_4$ treatment.

What is claimed is:
1. A process for the production of chromate oxidation products of alkyl aromatic hydrocarbon free from discoloring heavy metal impurities comprising in combination the steps of adjusting the pH of the product mixture obtained by the oxidation of alkyl aromatic hydrocarbons in the presence of chromates as necessary to obtain a pH of at least about 7, thereafter treating said product mixture with a soluble metal bisulfite to form a precipitate, separating out said precipitate and treating the remaining liquid with sulfur dioxide, thereafter recovering the alkyl aromatic oxidation product thus formed and recycling a portion of the metal bisulfite thus produced for treatment of additional oxidation products.

2. The process of claim 1 wherein the alkyl aromatic is an alkyl benzene.

3. The process of claim 2 wherein the alkyl benzene is toluene and the soluble metal bisulfite is an alkali metal bisulfite.

4. The process of claim 2 wherein the alkyl benzene is a xylene and the soluble metal bisulfite is an alkali metal bisulfite.

5. The process of claim 1 wherein the alkyl aromatic hydrocarbon is an alkyl naphthalene.

6. The process of claim 5 wherein the alkyl naphthalene is a dimethylnaphthalene and the soluble metal bisulfite is an alkali metal bisulfite.

7. The process of claim 1 wherein the precipitate separated out after treatment with the soluble metal bisulfite is regenerated by heating with water and oxygen to form $CO_2$, a metal chromate, a metal dichromate, all of which are recycled to the oxidation reactor for use in the oxidation of further quantities of alkyl aromatic hydrocarbons.

8. The process of claim 7 wherein the alkyl aromatic is an alkyl benzene.

9. The process of claim 8 wherein the alkyle benzene is toluene and the soluble metal bisulfite is an alkali metal bisulfite.

10. The process of claim 8 wherein the alkyl benzene is a xylene and the soluble metal bisulfite is an alkali metal bisulfite.

11. The process of claim 7 wherein the alkylaromatic hydrocarbon is an alkyl naphthalene.

12. The process of claim 11 wherein the alkyl naphthalene is a dimethylnaphthalene and the soluble metal bisulfite is an alkali metal bisulfite.

References Cited

UNITED STATES PATENTS

| | | | |
|---|---|---|---|
| 1,945,032 | 11/1934 | Demont | 260—524 |
| 2,005,774 | 6/1935 | Demont | 260—524 |
| 2,879,291 | 3/1959 | Elliott | 260—525 |

HENRY R. JILES, *Primary Examiner.*

UNITED STATES PATENT OFFICE
CERTIFICATE OF CORRECTION

Patent No. 3,413,343　　　　　　　　　　　　　　　　November 26, 1968

Joe T. Kelly

It is certified that error appears in the above identified patent and that said Letters Patent are hereby corrected as shown below:

Column 2, line 38, cancel "napthalenes such as methyl-, ethyl-, and propyl" and insert -- benzenes such as toluene, ethylbenzene, pro- --. Column 4, line 43, "alkyle" should read -- alkyl --.

Signed and sealed this 17th day of March 1970.

(SEAL)
Attest:

Edward M. Fletcher, Jr.　　　　　　　　　　WILLIAM E. SCHUYLER, JR.
Attesting Officer　　　　　　　　　　　　　　　Commissioner of Patents